Nov. 11, 1969   E. E. PAULSON   3,477,231
NOISE REDUCTION

Filed Dec. 26, 1967   2 Sheets-Sheet 1

Inventor
ELMIR E. PAULSON

ATTORNEY

United States Patent Office 3,477,231
Patented Nov. 11, 1969

3,477,231
NOISE REDUCTION
Elmir E. Paulson, Topsfield, Mass., assignor to General Electric Company, a corporation of New York
Filed Dec. 26, 1967, Ser. No. 693,655
Int. Cl. F02k *3/06, 11/00*
U.S. Cl. 60—269                                   3 Claims

ABSTRACT OF THE DISCLOSURE

The disclosure shows the forward portion of a turbofan engine employed in the propulsion of aircraft. The inlet to this engine is defined by a cowl which directs air to a fan or low pressure compressor, having a rotor on which a first circumferential row of blades is mounted. The inner portion of the air pressurized by the fan is directed into the entrance of a core engine or gas generator which drives the fan. The outer portion of the air pressurized by the fan is discharged through an annular nozzle, defined by the cowl and an inner nacelle, to provide a propulsive force from the engine. An annular splitter is provided in advance of the fan blades, and a second annular splitter is provided downstream of the fan between the cowl and inner nacelle. The opposite sides of the two splitters are lined with sound absorbent material, as are the inner surface of the cowl and the outer surface of the inner nacelle. The provision of the splitters and the sound absorbent material in this fashion are highly effective in reducing the propagation of noise, generated by the fan.

---

Figure 1:
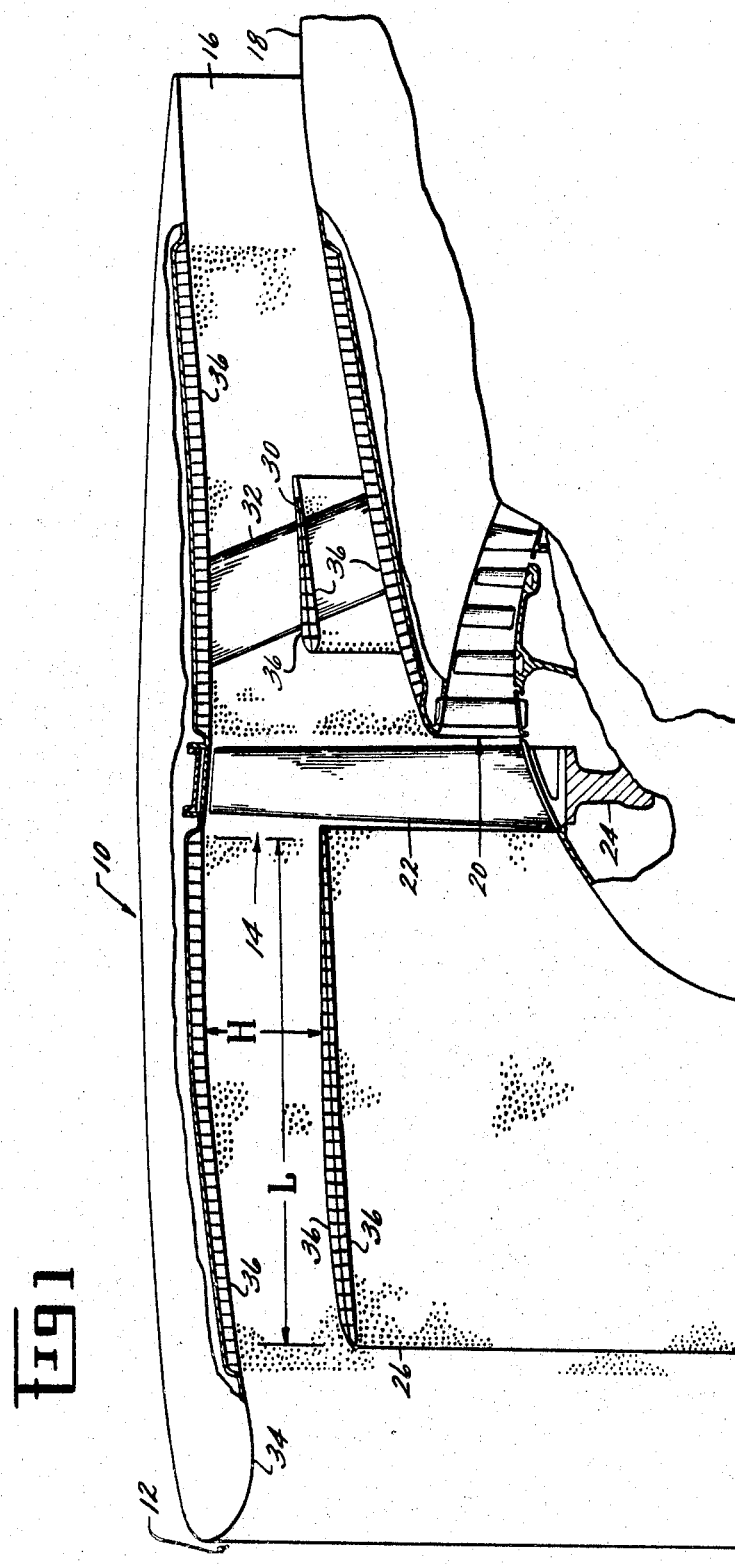

The present invention relates to improvements in gas turbine engines and, more particularly to improvements in the reduction of noise propagated by such engines.

While gas turbine engines have provided many benefits in the economic and high speed propulsion of aircraft, their use has created serious noise problems. The consequences of noise levels on those living near airports or along the approach paths to the airports are becoming increasingly more appreciated. While various sound suppressing techniques have been employed to reduce the nose perceived at ground level, their effectiveness has never been felt entirely satisfactory, particularly by those who are exposed to such noise conditions on a day-in and day-out basis.

Gas turbine engines originally provided a propulsive force solely through the discharge of a hot gas stream through a nozzle, and essentially all noise propagated by the engine resulted from the nozzle discharge. More recently gas turbine engines for commercial airplanes have been of the turbofan type in which a portion of the air entering the engine is pressurized and discharged through a nozzle to provide a complementary propulsive effect with a low energy, high mass air stream.

The turbofan type engine has now taken the form of an engine wherein the fan has extremely high tip speed to obtain a greater portion of the propulsive effect from the air stream, rather than from the hot gas stream. This has evolved to the point where noise generated by the fan is of a greater consequence than noise generated by the hot gas stream being discharged from the nozzle. Not only is this fan noise propagated in a rearward direction, its forward propagation can be the most objectionable noise factor, particularly at low flight speeds, such as are encountered during the landing of an aircraft. Similar problems are encountered in high performance turbojet engines, where high compressor tip speeds can generate and propagate objectionable noise in a forward direction.

One solution to the suppression of noise generated by the fans is to utilize sound suppression material as a liner for the cowl which defines the outer bounds of the air flow path to and through the fan to the nozzle. Due to aerodynamic and weight considerations such a use of sound suppression material has not had the desired effectiveness in reducing fan noise propagation in a forward direction.

Accordingly, one object of the invention is to minimize the propogation of sound from a gas turbine engine and, particularly, sound generated by a low pressure compressor, commonly referred to as a fan.

A more specific object of the invention is to effectively minimize such noise as it is propagated in a forward direction, particularly during the approach of an aircraft to a landing field.

Yet another object of the invention is to accomplish the above end with little or no adverse effect on the operating characteristics of the engine.

These ends are attained by the provision of a duct, defining the air flow path, a compressor, and an annular splitter concentric of this duct. The opposed surfaces of the duct and the splitter are lined with sound absorbing material and thereby provide a highly effective means for reducing sound propagation from the duct.

The above and other related objects and features of the invention will be apparent from a reading of the following description of the disclosure found in the accompanying drawings and the novelty thereof pointed out in the appended claims.

Figure 2:
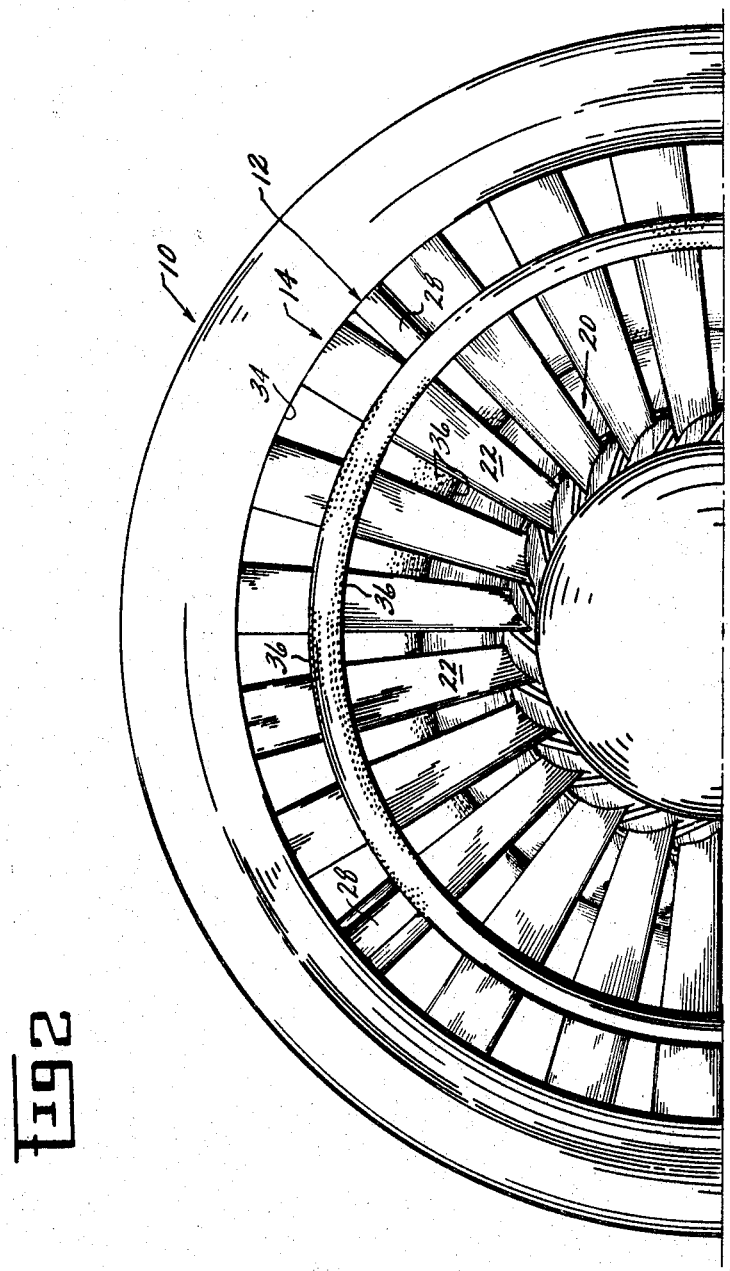

In the drawings:

FIGURE 1 is a longitudinal half section, with portions broken away, of a turbofan type engine embodying the present invention; and FIGURE 2 is an end view of half of the inlet to this engine.

FIGURE 1 illustrates the forward portion of a turbofan engine which comprises an outer cowl 10 defining the outer bounds of the flow path of air entering the engine inlet 12. This is pressurized by a low pressure compressor, or fan, 14. The outer portion of the pressurized air is discharged through an annular nozzle 16 formed by the downstream end of the cowl 10 and an inner nacelle 18. The inner portion of the air pressurized by the fan 14 enters the inlet 20 to a core engine. The air entering the inlet 20 is further pressurized, in a known fashion, to support combustion of fuel in the generation of a hot gas stream, which in turn provides the motive power for the fan 14.

The fan 14 comprises a plurality of blades 22 which are mounted on a rotor 24. The rotor 24 is rotated by turbine means which are driven by the hot gas stream of the core engine.

An annular splitter 26 is mounted concentrically of the inlet portion of the cowl 10 by struts 28 (FIGURE 2) extending therebetween. A second annular splitter 30 is mounted downstream of the fan rotor, also concentrically of the cowl 10 and intermediate the forward portion of the nacelle 18. The splitter 30 is supported by struts 32 extending between the cowl 10 and the nacelle 18.

Preferably the leading edge of the splitter 26 is adjacent to and spaced downstream of a nozzle throat 34 which is formed at the cowl entrance. The trailing edge is preferably closely adjacent the fan blades 22.

The leading edge of the aft splitter 30 is disposed adjacent the trailing edge of the fan blades 22 and is preferably spaced therefrom a distance approximating 100%–150% of the fan blade chord length at the radial distance of the splitter. The splitter 30 terminates at a point remote from the nozzle 16 so that there will be no adverse effect on the propulsive efficiency of the nozzle. It is also to be noted that the splitters 26 and 30 are of airfoil shape to have a minimum effect on air flow to the fan and pressurized air discharged therefrom.

Particularly in the case of the inlet splitter 26, its spacing (H) from the cowl 10 and its length (L) are selected so that there is a relatively large $L/H$ ratio. The opposed surfaces of the splitter and cowl, having a large $L/H$ ratio, are lined with sound-absorbing panels, designated at 36. This combination gives significant reductions in noise propagation. The inner surface of the splitter 26 may also be lined with sound-absorbing panels 36 which further reduce noise propagation.

Similarly, the opposed surfaces of the aft splitter 30 and the cowl 10 are lined with sound-absorbing panels 36, and the opposed surfaces of the splitter 30 and nacelle 18 are lined with sound-absorbing panels 36. The sound-absorbing panels 36 may also extend aft of the splitter 30 so that at least a portion of the opposed surfaces of the cowl 10 and the nacelle 16 function in a manner similar to the surfaces provided by the splitter 30.

The present invention has benefit in increasing the effectiveness in most, if not all, sound-absorbing panels and is not limited to any particular panel construction. However, as a matter of example, reference is made to U.S. Patent 3,113,634, which shows one type of sound-absorbing panel.

While the greater significance of the present invention is in reducing propagation of noise in a direction forwardly of a compressor, it should also be recognized that the benefits of the invention are applicable to various forms of engines employing compressors. As previously pointed out, propagation of sound in a forward direction from a turbojet engine can also be a problem, and the present invention is applicable thereto. Similarly, low pressure compressors or fans may be powered other than by a bypass type of turbofan engine, referenced herein, and the present invention employed with similar benefits.

Having thus described the invention, what is claimed as novel and desired to be secured by Letters Patent of the United States is:

1. In an engine, employed for the propulsion of an aircraft, which includes a compressor having a bladed rotor,
   - a cowl defining the flow path of air to and through the compressor,
   - an annular splitter, of airfoil longitudinal section, disposed generally concentrically within said cowl, intermediate the upstream end of said cowl and said blades,
   - sound absorbing panels mounted on the opposed surfaces of said cowl and splitter, with
   - the length of said splitter being several times the radial distance between said splitter and cowl.

2. The combination of claim 1 wherein,
   - the engine is a turbofan engine and the compressor is a low pressure compressor fan for generating a pressurized air stream to be discharged through an annular nozzle,
   - said cowl defines the outer bounds of the air flow path to the fan, and further defines the outer bounds of said annular nozzle downstream of said fan,
   - said engine includes a nacelle defining the inner bounds of said annular nozzle,
   - said nacelle further having its leading edge adjacent the downstream portion of said rotor blades,
   - a second annular splitter is disposed concentrically of said cowl with its leading edge spaced from the trailing edges of the rotor blades a distance approximately 100%–150% of the fan blade chord at that radius, said second splitter terminating at a point remote from said nozzle, and
   - sound-absorbing panels are mounted on the opposing surfaces of said second splitter and cowl.

3. The combination of claim 2 wherein,
   - the inner surface of the inlet splitter is also lined with sound-absorbing panels.

References Cited

UNITED STATES PATENTS

| | | | |
|---|---|---|---|
| 2,869,670 | 1/1959 | Hoffman | 230—232 |
| 3,303,653 | 2/1967 | Hull | 60—226 |
| 3,346,174 | 10/1967 | Lievens | 230—232 |

FOREIGN PATENTS

| | | |
|---|---|---|
| 935,119 | 8/1963 | Great Britain. |
| 937,826 | 9/1963 | Great Britain. |

CARLTON R. CROYLE, Primary Examiner

DOUGLAS HART, Assistant Examiner

U.S. Cl. X.R.

60—226; 181—33; 230—122, 232; 253—39